(12) United States Patent
Getio et al.

(10) Patent No.: US 10,275,751 B2
(45) Date of Patent: Apr. 30, 2019

(54) AUTO REMOTE MANAGEMENT CONFIGURATION FOR A SELF-SERVICE TERMINAL (SST) NETWORK

(71) Applicant: NCR Corporation, Duluth, GA (US)

(72) Inventors: Geril Sandoval Getio, Cebu (PH); Juanito Abarintos Aranas, Jr., Cebu (PH); Shaneen Rose Alviola Galela, Cebu (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/976,812

(22) Filed: Dec. 21, 2015

(65) Prior Publication Data

US 2017/0178101 A1 Jun. 22, 2017

(51) Int. Cl.
| | | |
|---|---|---|
| *G07F 9/00* | (2006.01) | |
| *G07F 9/02* | (2006.01) | |
| *G06Q 10/06* | (2012.01) | |
| *G06Q 20/18* | (2012.01) | |
| *G06Q 20/20* | (2012.01) | |
| *G06Q 30/06* | (2012.01) | |

(52) U.S. Cl.
CPC ....... *G06Q 20/202* (2013.01); *G06Q 10/0631* (2013.01); *G06Q 20/18* (2013.01); *G06Q 30/0601* (2013.01); *G07F 9/006* (2013.01); *G07F 9/026* (2013.01)

(58) Field of Classification Search
CPC .............................. G06Q 20/20; G06Q 20/202
USPC ......................................................... 705/21
See application file for complete search history.

(56) References Cited

U.S. PATENT DOCUMENTS

| | | | | |
|---|---|---|---|---|
| 6,834,298 | B1 * | 12/2004 | Singer ................. | H04L 41/0253 709/220 |
| 7,240,106 | B2 * | 7/2007 | Cochran ........... | H04L 29/12009 709/220 |
| 2009/0076922 | A1 * | 3/2009 | de Gruil ................ | G06Q 10/06 705/16 |

OTHER PUBLICATIONS

NMAP 6 Release Notes.pdf , Retrieved on Dec. 6, 2016, Retrieved from the Internet <https://web.archive.org/web/20140208062721/http://nmap.org/6/[12/6/2016 12:48:52 PM]>.*

* cited by examiner

*Primary Examiner* — A. Hunter Wilder
*Assistant Examiner* — Joseph M Mutschler
(74) *Attorney, Agent, or Firm* — Schwegman, Lundberg & Woessner

(57) ABSTRACT

A Self-Service (SS) management terminal manages one or more Self-Service Terminals (SSTs) communicating over a network. A scan of the network reveals SSTs capable of reporting real-time transaction information to the SS management terminal. The scan also reveals which SSTs are capable of reporting but not currently reporting to the SS management terminal or any other SS management terminal available in the network. A Graphical User Interface (GUI) is rendered on a display of the SS management terminal permitting an operator to assign one or more unassigned but capable SSTs to the SS management terminal. Settings are automatically updated on those SSTs for reporting their real-time transaction information to the SS management terminal.

4 Claims, 8 Drawing Sheets

US 10,275,751 B2

AUTO REMOTE MANAGEMENT CONFIGURATION FOR A SELF-SERVICE TERMINAL (SST) NETWORK

BACKGROUND

Managing Self-Service Terminals (SSTs), such as Self-Service Checkout (SSCO) stations, is often a laborious task especially when there are multiple lanes SSCO stations. Each SSCO station needs to communicate with a store server and typically this is done through a management terminal. The management terminal is configured to monitor some of the SSCO stations and is typically within line of sight or close distance to the SSCO stations that the management terminal manages. This is so, because should assistance or overrides be needed, a clerk managing a management terminal can see what is happening on the management terminal and quickly assist.

However, because a single clerk can only handle a limited number of SSCO stations and because a management terminal can only manage report information from a limited number of SSCO stations, a single management terminal cannot be too loaded. As a result, a typical retail setting will have several management terminals.

One issue with configuration of assigning one or more groupings of SSCO stations to a particular management terminal is that different configurations are often desired by the retail outlet based on current needs or operational status of the SSCO stations and the management terminals. So, it is not uncommon to regularly have the need to change assignments between one or more groupings of SSCO stations and their assigned management terminal.

However, the current approaches require each SSCO station to be manually configured to communicate with its corresponding management terminal. This is time consuming and may necessitate a reboot of the changed SSCO station. Many retail outlets are open 24 hours a day and 7 days a week, which means that these manual configurations are often done at off traffic hours, which is not very flexible should configuration changes be needed during peak traffic hours.

SUMMARY

In various embodiments, methods and a Self-Service (SS) management terminal are provided for automated remote management configuration of a SST network are provided.

According to an embodiment, a method for automated remote management configuration of a SST network is provided. Specially, a network of Self-Service Terminals (SSTs) is scanned for SSTs capable of reporting real-time transaction information. Next, at least one capable SST of reporting that SST's real-time transaction information is automatically configured for the reporting.

DETAILED DESCRIPTION

Figure 1A:
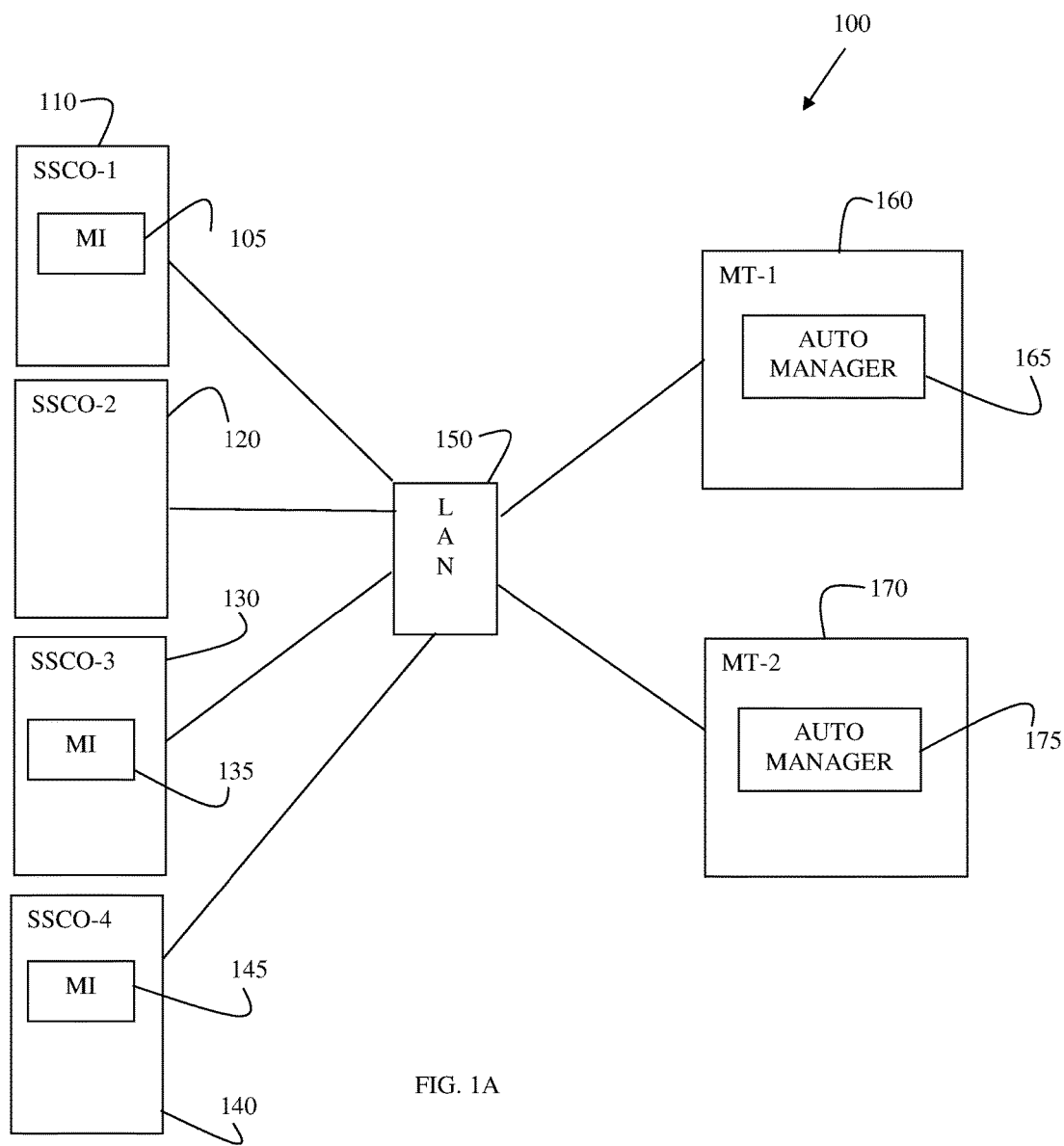
FIG. 1A is a diagram illustrating components of a SST configuration management system, according to an example embodiment.

FIG. 1A is a diagram illustrating components of a SST configuration management system 100, according to an example embodiment. It is to be noted that the SST configuration management system 100 is shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or less components are possible without departing from the teachings of automated remote management configuration of a SST network, presented herein and below.

Furthermore, the techniques and the systems presented herein and below (for automated remote management configuration of a SST network) may include all or some combination of the components shown with the system 100. The methods are programmed as executable instructions in memory and/or non-transitory computer-readable storage media and executed on one or more processors associated with the components/devices.

Specifically, the system 100 includes four SSCO terminals 110, 120, 130, and 140; two SS management terminals 160 and 170, and a Local Area Network (LAN) 150. SSCO terminals 110, 130, and 140 include a management interface 105, 135, and 145, respectively. Each of the SS management terminals 160 and 170 include an automatic configuration manager (herein after "auto manager") 165 and 175, respectively.

Initially, it is to be noted that a SSCO terminal is one type of SST, other types of SSTs that can be equally utilized with the teachings presented herein include, but are not limited to, an Automated Teller Machine (ATM) and a kiosk.

The management interfaces (105, 135, and 145) are software agents that are executed as executable instructions from non-transitory memory or storage by processors of the SSCO terminals (110, 130, and 140). Each instance of the management interface (105, 135, and 145) is responsible for communicating status, diagnostics, and transaction information to its assigned management terminal (160 or 170).

Each SS management terminal (160 and 170) may include real-time management software that permits an operator to view transactions taking place on the SSCO terminals (110, 130, and/or 140). The viewed transactions on the displays of the SS management terminals (160 and 170) depends on the assigned and configured SSCO terminals (110, 130, and 140) assigned to the SST management terminals (160 and/or 170).

Each SS management terminal (160 and 170) reports transaction information to a server (which may be located on the LAN 150 or located external to the system 100 over a Wide-Area Network (WAN and not shown in the FIG. 1A).

Initially, each SSCO terminal (110, 130, and 140) needs properly configured to report and communicate over the LAN 150 to an assigned SS management terminal (160 and/or 170). Conventionally, this is done by manually configuring each SSCO terminal (110, 130 and 140) with a host name to a specific management terminal (160 or 170). This typically entails installing a key in a registry of each SSCO terminal (110, 130 and 140) representing a specific LAN-identifiable host name (resolvable to an Internet Protocol (IP) address) for a specific management terminal (160 or 170). As stated before, this is time consuming, labor intensive, and non-intuitive to an operator performing the manual configuration.

Until a SSCO terminal (110, 130, and 140) is configured to communicate with a specific SS management terminal (160 and/or 170) that SSCO terminal (110, 130 and 140) cannot operate as a SST because it will be unable to report management information that is communicated to a store or retail server where transaction metrics are collected and monitored in real time and that SSCO terminal (110, 130, 140) will be unable to provide real-time transaction information to a SS management terminal (160 or 170) that is monitored by a store clerk during SS transactions being performed by customers of the store.

In the example configuration shown in the FIG. 1A, SSCO-2 120 terminal lacks an installed management interface (105, 135, or 145), which means that is unable to participate in SST transactions. This may be for a variety of reasons, such as SSCO-2 120 is being operated by a store clerk and is directly connected to the store server to report transaction metrics or SSCO-2 has not yet been configured to have an executing instance of the management interface (105, 135, or 145).

An example processing scenario is now discussed with reference to the example configuration of the FIG. 1A and operation of the novel auto manager (165 and 175). Again, it is noted that there can be different configurations of the system 100 that includes more SSCO terminals with or without a corresponding management interface, and more or less SS management terminals. The processing scenario is therefore presented to demonstrate features of the auto manager (165 and 175) with the context of a specific configuration scenario depicted in the FIG. 1A.

Some example, GUI screens and interface screens rendered by the auto managers (160 and 170) are presented below with the discussion of the FIGS. 1B-1E, which include different configurations from that which is shown in the FIG. 1A.

Initially, an operator access a user-facing interface associated with auto manager 165 of SS management terminal 160 and selects an auto configuration option. The auto manager 165 then performs a scan of the LAN 150 to discover the SSCO terminal names and IP addresses over the LAN 150. The scan can also check Basic Input/Output System (BIOS) settings for the SSCO terminals (110, 120, 130, and 140) to detect whether the SSCO terminals (110, 120, 130, and 140) have an installed management interface (105, 135, and 145). This reveals that SSCO-2 120 includes no management interface (105, 135, or 145) installed on SSCO-2 120 and is unavailable for automatic configuration being performed by the auto manager 165 of SS management terminal 160.

In an embodiment, while the auto manager 165 is performing the LAN 150 scanning, a user-presented screen is rendered on a display of the SS management terminal 160 showing the current status of the scanning and results as detected by the auto manager. An example status screen rendering to a display of a SS management terminal (160 and/or 170) is depicted in the FIG. 1D.

Next, the auto manager 165 can query settings associated with each of the available SSCO terminals (110, 130, and 140) and being used by those terminals' corresponding management interfaces (105, 135, and 145). This query provides results to the auto manager 165 as to what if any SSCO terminal (110, 130, and 140) is currently interfacing to SS management terminal (160 and/or 170).

After the scan, and in an example processing scenario, the auto manager 165 has information for each SSCO terminal (110, 120, 130, and 140). The information includes the host names, IP addresses, and assignments, if any, to specific SS management terminals (160 and/or 170).

Next, the auto manager 165 presents a user-facing interface screen (see the example below with the FIG. 1E) that an operator of management terminal 160 can interactively manipulate to communicate desired configuration information to the auto manager.

The user-facing interface screen reveals that: 1) SSCO-1 110 is current assigned to report and communicate transaction information in real time to SS management terminal 170; 2) SSCO-3 130 is current not assigned to any SS management terminal (160 or 170); and 2) SSCO-4 140 is current assigned to remote and communicate transaction information in real time to SS management terminal 160.

The operate interacts with the user-facing interface presented by the auto manager 165 to graphical drag and drop a graphical representation of SSCO-3 130 into an empty graphical slot for management terminal 160. This directs the auto manager 165 to communicate with SSCO-3 130 over the LAN 150 and update a registry key on SSCO-3 for management interface 135 with a hostname on the LAN 150 for SS management terminal 160. Once this is done, SSCO-3 130 through 135 is properly configured and will begin to report transaction information over the LAN 150 to SS management terminal 160. SSCO-3 130 is now fully operation and real-time transaction information, diagnostics, etc. will be relayed in real time from management interface 135 to SS management terminal 160. SS management terminal 160 will also relay the real time information to a store server for storage and reporting purposes and for coordination with transaction information occurring with the store.

This is achieved in an automatic fashion that an operator of SS management terminal 160 defines through a GUI provided by the auto manager 165. One appreciates that this is a substantial improvement in terms of usability and time from the manual configuration approach that presently exists in the industry.

In an embodiment, the SSCO terminals (110, 120, 130, and/or 140) are deployed in: a retail store or a grocery store.

A variety of sample GUI screen shots that the auto configuration manager (165 or 175) can produce is now discussed with reference to the FIGS. 1B-1E. It is to be noted that these screen shots are not intended to be all inclusive and that other screen shots with more or less information can be provided by the auto configuration manager (165 and/or 175).

With respect to the labeling of the FIGS. 1B-1E it is to be noted that the reference items labeled as RAP (Remote Approval Program) are SS management terminals having executing instances of an auto manager as discussed above with reference to the FIG. 1A. The reference items labeled SSCO are SSCO terminals as discussed above with reference to the FIG. 1A.

Figure 1B:
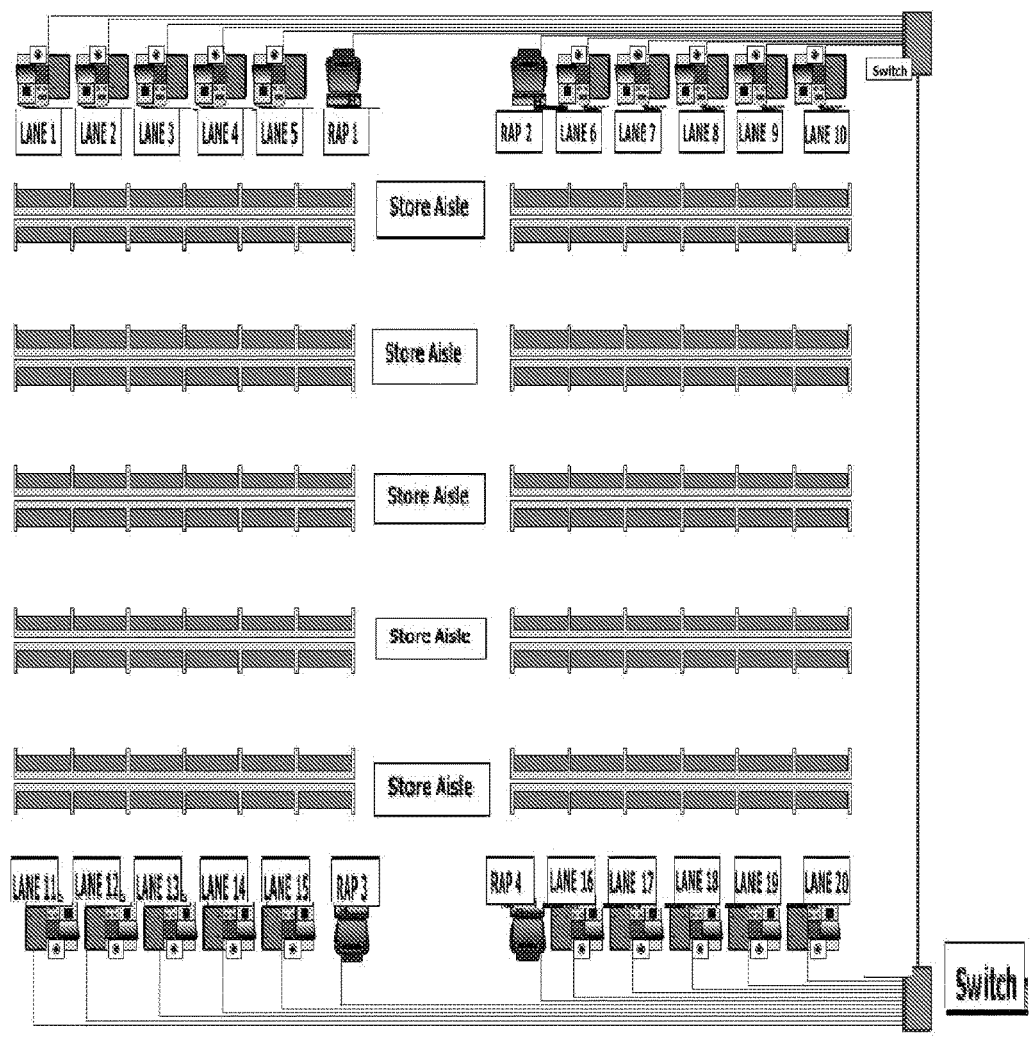
FIG. 1B illustrates a Graphical User Interface (GUI) presenting, on a display of a SS management terminal, a view of a sample retail layout of SSCO terminals, store aisles, and management terminals, according to an example embodiment.

FIG. 1B illustrates a Graphical User Interface (GUI) presenting, on a display of a SS management terminal, a view of a sample retail layout of SSCO terminals, store aisles, and management terminals, according to an example embodiment.

FIG. 1B depicts a screen shot rendered to a SS management terminal showing a visual layout of a retail store including store aisles, management terminals, and SSCO terminals and with physical proximity of those components to one another rendered to scale.

In an embodiment, the sample retail layout is rendered by a remote management application executing on each of the SS management terminals. The auto manager of the FIG. 1A being integrated into the remote management application as an enhanced feature of the remote management application.

Figure 1C:
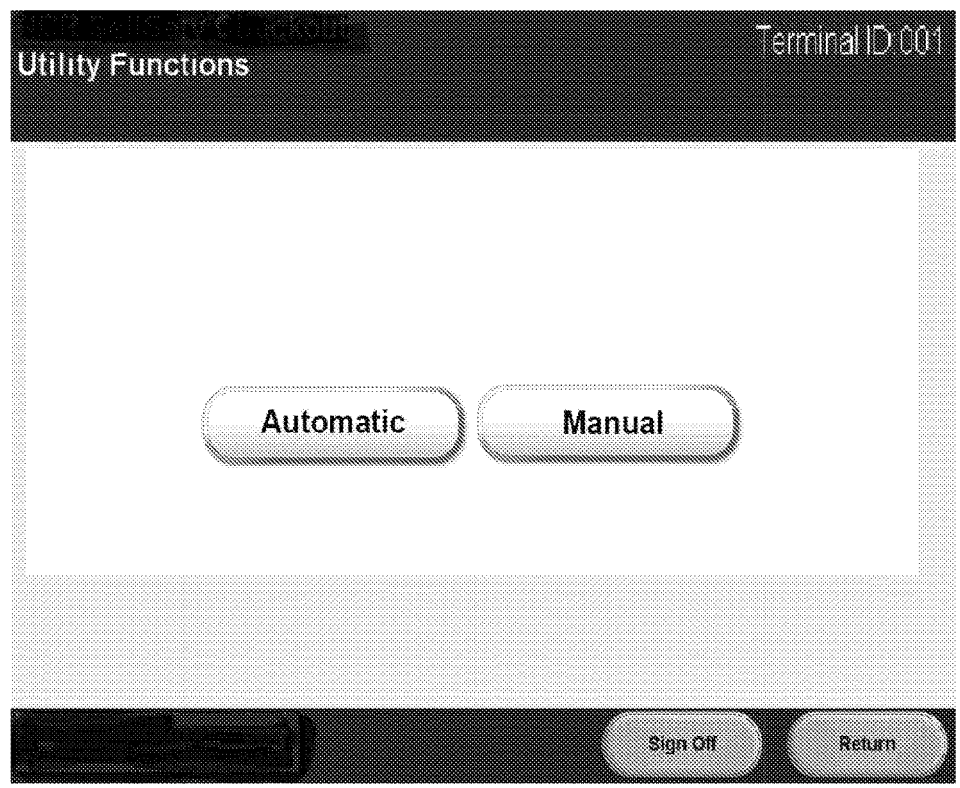
FIG. 1C illustrates another GUI presentation, on a display of a SS management terminal, a view of an interface for selecting an automatic configuration of SSCO terminal assignments to management terminals, according to an example embodiment.

FIG. 1C illustrates another GUI presentation, on a display of a SS management terminal, a view of an interface for selecting an automatic configuration of SSCO terminal assignments to management terminals, according to an example embodiment.

Again, and in an embodiment, the addition of a selection between automatic configuration (automatic) and manual button (manual) depicted in the screen shot of the FIG. 1C may be an enhancement made to an existing remote management application executing on each of the SS management terminals to provide access to the auto manager of the FIG. 1A.

Figure 1D:
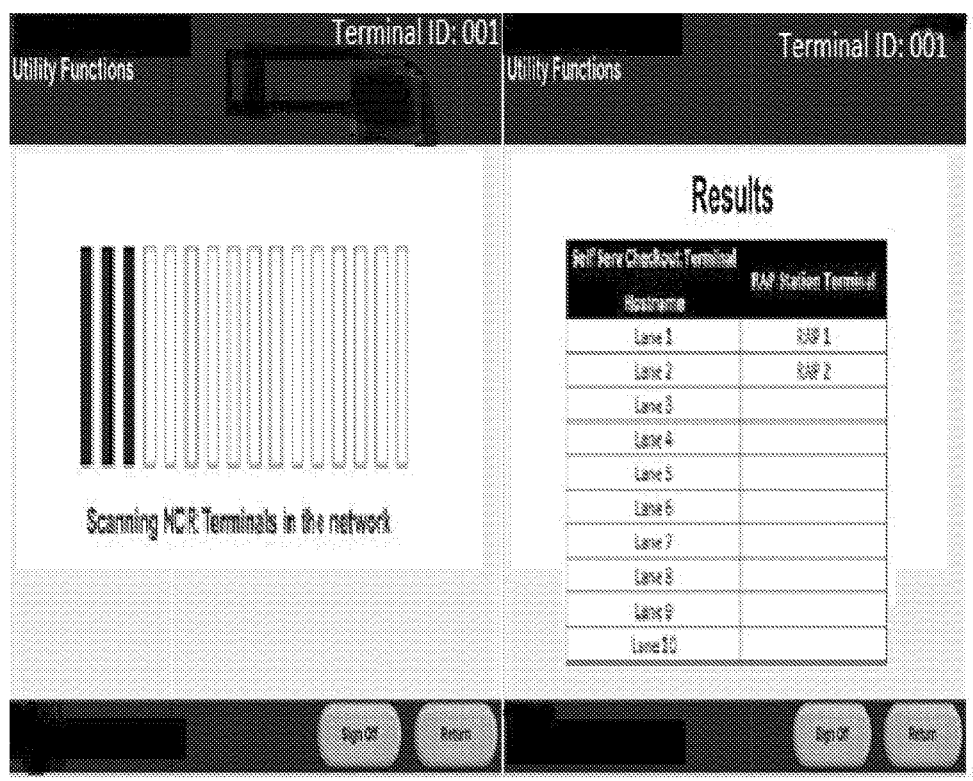
FIG. 1D illustrates another GUI presentation, on a display of a SS management terminal, a view after the automatic configuration option from the interface of the FIG. 1C is selected reflecting a current status of automatic configuration processing, according to an example embodiment.

FIG. 1D illustrates another GUI presentation, on a display of a SS management terminal, a view after the automatic configuration option from the interface of the FIG. 1C is selected reflecting a current status of automatic configuration processing, according to an example embodiment.

The FIG. 1D reflects a status or the scanning performed by the auto manager discussed above with the FIG. 1A.

In an embodiment, the screen shot of the FIG. 1D is generated by the auto manager and integrated into an existing remote management application executing on each of the SS management terminals.

Figure 1E:
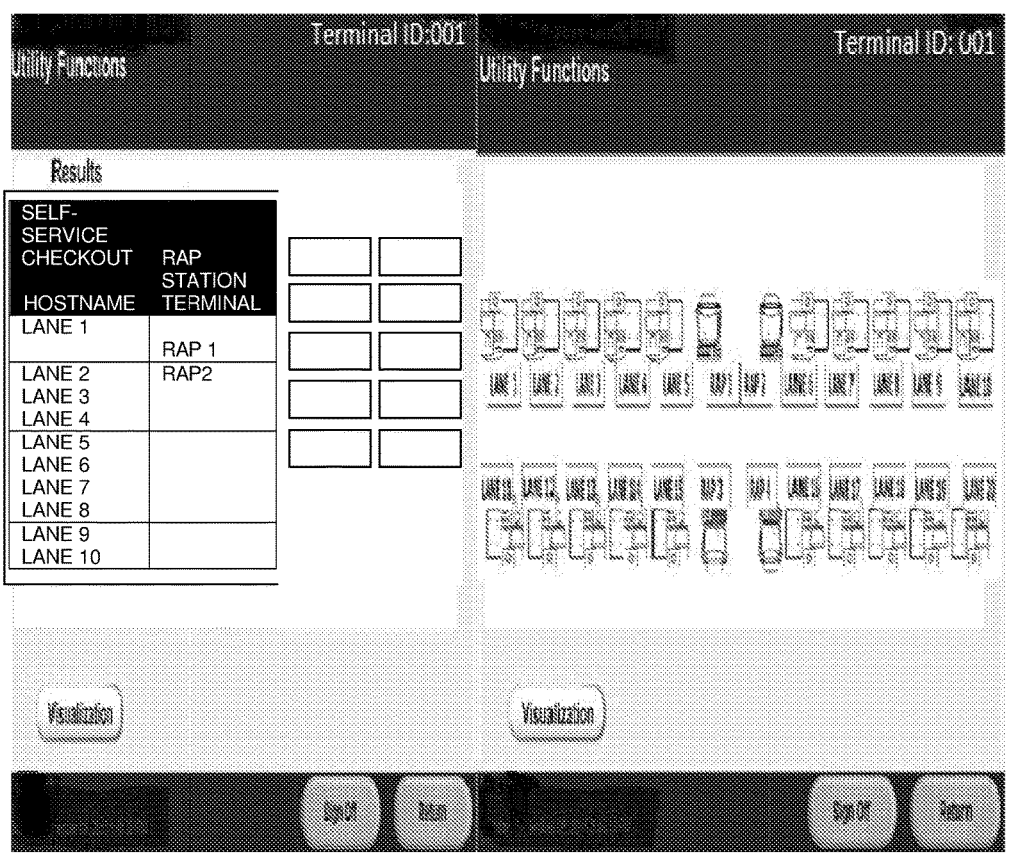
FIG. 1E illustrates another GUI presentation, on a display of a SS management terminal, a view of an interface permitting graphical user-selected assignments of SSCO terminals to specific SS management terminals, according to an example embodiment.

FIG. 1E illustrates another GUI presentation, on a display of a SS management terminal, a view of an interface permitting graphical user-selected assignments of SSCO terminals to specific SS management terminals, according to an example embodiment.

The FIG. 1E reflects the interactive assignment that can be made by an operator of an SS management terminal as discussed above with reference to the FIG. 1A.

In an embodiment, the interactive interface screen shot of the FIG. 1E is generated by the auto manager and integrated into an existing remote management application executing on each of the SS management terminals.

These and other embodiments are now discussed with reference to the FIGS. 2-4.

Figure 2:
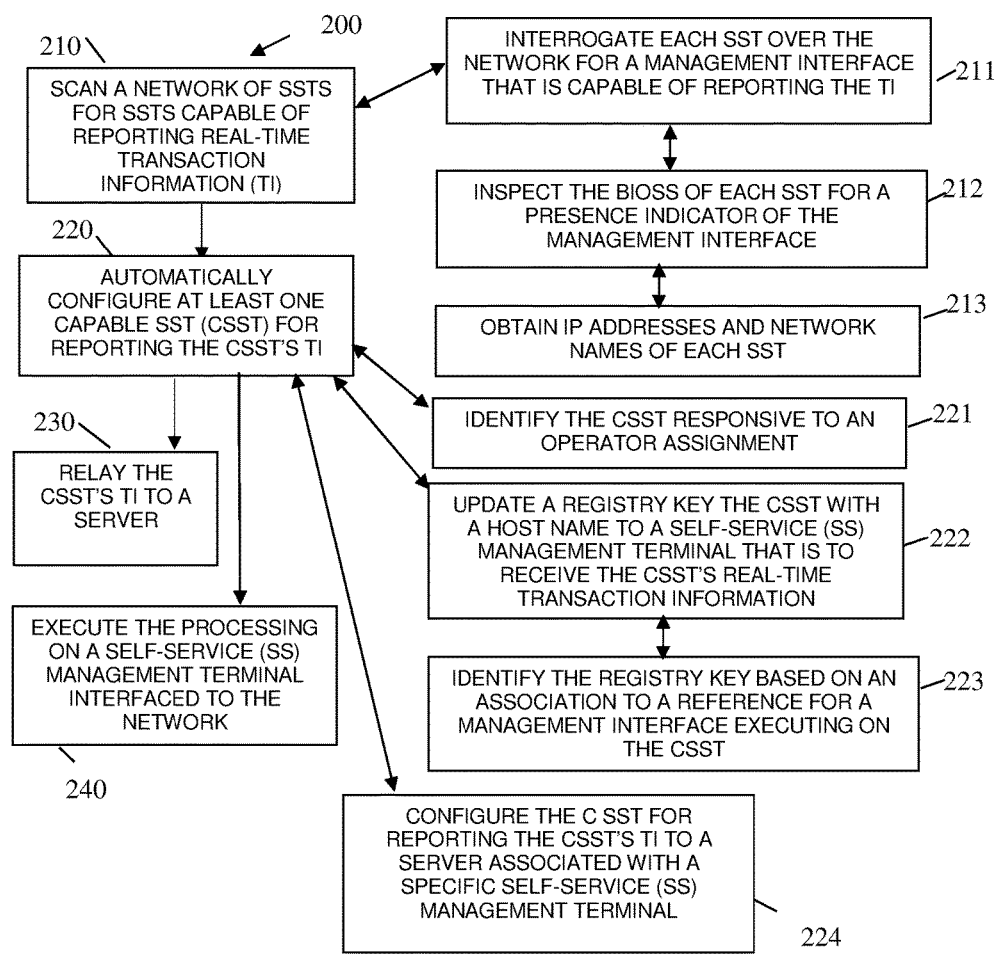
FIG. 2 is a diagram of a method for automated remote management configuration of a SST network, according to an example embodiment.

FIG. 2 is a diagram of a method 200 for automated remote management configuration of a SST network, according to an example embodiment. The software module(s) that implements the method 200 is referred to as a "SST network configuration manager." The SST network configuration manager is implemented as executable instructions programmed and residing within memory and/or a non-transitory computer-readable (processor-readable) storage medium and executed by one or more processors of a device. The processor(s) of the device that executes the SST network configuration manager are specifically configured and programmed to process the SST network configuration manager. The SST network configuration manager has access to a network during its processing. The network can be wired, wireless, or a combination of wired and wireless.

In an embodiment, the device that executes the SST network configuration manager is one of the SS management terminals (160 or 170) of the FIG. 1A.

In an embodiment, the device that executes the SST network configuration manager is a cashier terminal in geographic proximity to SSTs.

In an embodiment, the SST network configuration manager is the auto manager (165 or 175) of the FIG. 1A.

At 210, the SST network configuration manager scans a network of SSTs for SSTs capable of reporting real-time transaction information.

In an embodiment those SSTs capable are described above with reference to the FIG. 1A.

In an embodiment, the network of SSTs is the LAN 150 of the FIG. 1A.

According to an embodiment, at 211, the SST network configuration manager interrogates each SST over the network for a management interface that is capable of reporting the real-time transaction information.

In an embodiment, the real-time transaction management interface is the management interface (105, 135, or 145) of the FIG. 1A.

In an embodiment of 211 and at 212, the SST network configuration manager inspects BIOSs of each SST for a presence indicator of the management interface.

In an embodiment of 212 and at 213, the SST network configuration manager obtains IP address and network names of each SST.

At 220, the SST network configuration manager automatically configures one or more SSTs for reporting those SSTs' real-time transaction information.

According to an embodiment, at 221, the SST network configuration manager identifies those SSTs for automatic configuration responsive to an operator's assignment made in an interface to the SST network configuration manager.

In an embodiment, the interface is the auto manager (165 or 175) of the FIG. 1A.

In an embodiment, at 222, the SST network configuration manager updates a registry key for those SSTs that are automatically configured with a host name to a SS management terminal that is to receive those SSTs' real-time transaction information.

In an embodiment of 222 and at 223, the SST network configuration manager identifies the registry key based on an association to a reference for a management interface executing on those SSTs that are automatically configured.

In an embodiment, at 224, the SST network configuration manager configures those SSTs that are automatically configured for reporting those SSTs' real-time transaction information to a server associated with a specific SS management terminal.

According to an embodiment, at 230, the SST network configuration manager relays the real-time transaction information for those SSTs that are automatic configured to a server. For example, the store server discussed above with reference to the FIG. 1A.

In an embodiment, at 240, the SST network configuration manager executes on a SS management terminal interfaced to the network of the SSTs.

Figure 3:
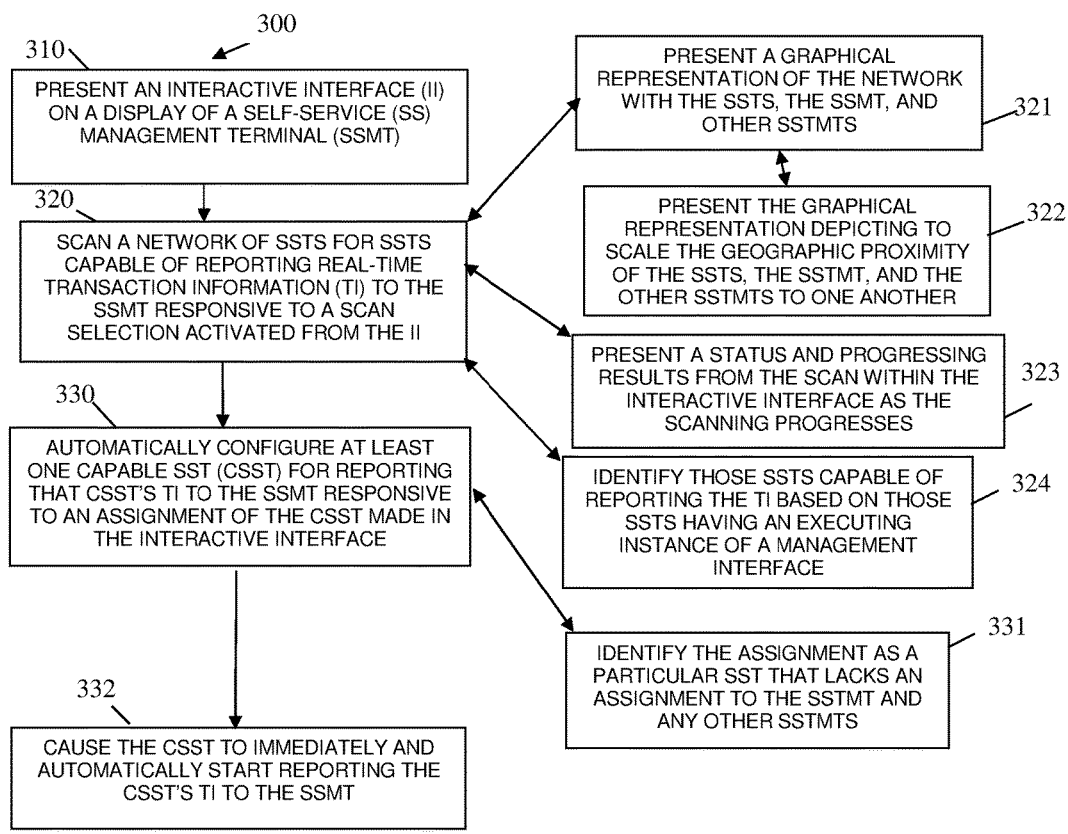
FIG. 3 is a diagram of another method for automated remote management configuration of a SST network, according to an example embodiment.

FIG. 3 is a diagram of another method 300 for automated remote management configuration of a SST network, according to an example embodiment. The software module(s) that implements the method 300 is referred to as a "remote terminal configuration manager." The remote terminal configuration manager is implemented as executable instructions programmed and residing within memory and/or a non-transitory computer-readable (processor-readable) storage medium and executed by one or more processors of a hardware device. The hardware processors that execute the remote terminal configuration manager are specifically configured and programmed to process remote terminal configuration manager. The remote terminal configuration manager has access to one or more networks during its processing. Each network can be wired, wireless, or a combination of wired and wireless.

In an embodiment, the remote terminal configuration manager is the auto manager (165 or 175) of the FIG. 1A.

In an embodiment, the remote terminal configuration manager is the method 200 of the FIG. 2.

In an embodiment, the device that executes the remote terminal configuration manager is the SS management terminal (160 or 170) of the FIG. 1.

In an embodiment, the device that executes the remote terminal configuration manager is cashier operated terminal in geographic proximity to the SSTs.

In an embodiment, the processing of the remote terminal configuration manager reflects another and in some cases enhanced perspective of the processing associated with the method 200 of the FIG. 2.

At 310, the remote terminal configuration manager presents an interactive interface on a display of a SS management terminal.

In an embodiment, the SS management terminal is the SS management terminal (160 or 170) of the FIG. 1A.

In an embodiment, the interactive interface is the interface discussed above with respect to the FIGS. 1A-1E.

At 320, the remote terminal configuration manager scans a network of SSTs for SSTs capable of reporting real-time transaction information to the SS management terminal.

In an embodiment, the scan is processed in the manners discussed above with respect to the FIG. 1A and/or the method 200 of the FIG. 2.

In an embodiment, the network is the LAN 150 of the FIG. 1A.

According to an embodiment, at 321, the remote terminal configuration manager presents a graphical representation of the network with the SSTs, the SS management terminal, and other SS management terminals interfaced to the network.

In an embodiment, the graphical representation is the graphical representation presented in the FIG. 1B.

In an embodiment of 321 and at 322, the remote terminal configuration manager presents the graphical representation depicting to scale the geographical proximity of the SSTs, the SS management terminal, and the other SS management terminals.

In an embodiment, at 323, the remote terminal configuration manager presents a status and processing results from the scan within the interactive interface as the scanning progresses.

In an embodiment, the status and processing results is the screen shot depicted in the FIG. 1D.

In an embodiment, at 324, the remote terminal configuration manager identifies the SSTs capable of reporting their real-time transaction information based on those SSTs having an executing instance of a management interface.

In an embodiment, the management interface is the management interface (105, 135, and 145) of the FIG. 1A.

At 330, the remote terminal configuration manager automatically configures one or more SSTs capable of reporting those SSTs' real time transaction information to the SS management terminal n response to and responsive to an assignment of those SSTs made in the interactive interface.

In an embodiment, at 331, the remote terminal configuration manager identifies the assignment as a particular SST that lacks an assignment to the SS management terminal and any other SS management terminals.

In an embodiment, at 332, the remote terminal configuration manager causes those SSTs that are being automatically configured to immediately begin or start reporting their real-time transaction information to the SS management terminal.

Figure 4:
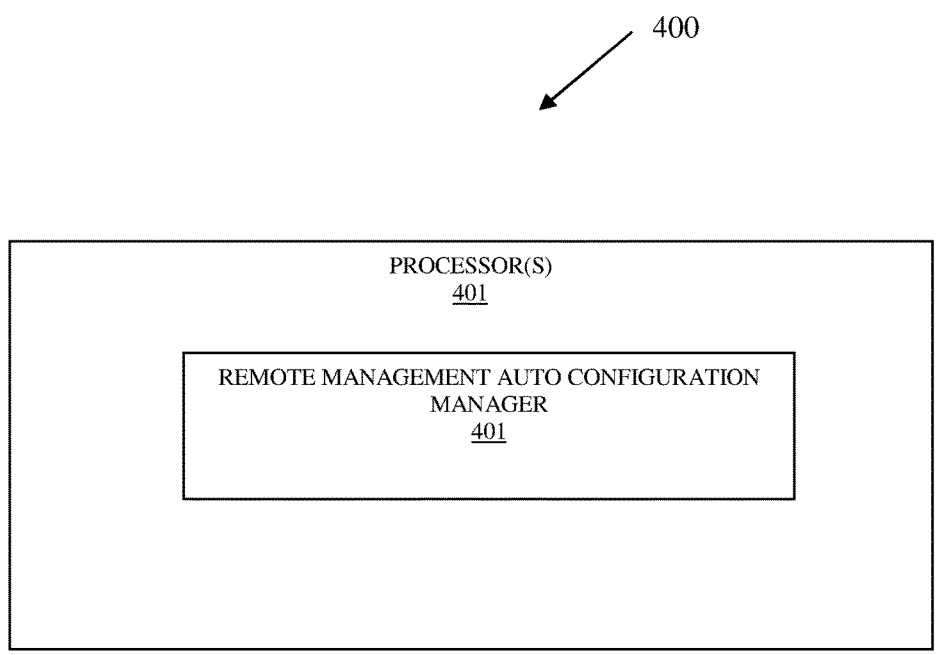
FIG. 4 is a diagram of SS management terminal, according to an example embodiment.

FIG. 4 is a diagram of SS management terminal 400, according to an example embodiment. Some components of the SS management terminal 400 are programmed and reside within memory and/or a non-transitory computer-readable medium and execute on one or more processors of the SS management terminal 400. The SS management terminal 400 communicates over one or more networks, which can be wired, wireless, or a combination of wired and wireless.

In an embodiment, the SS management terminal 400 is the SS management terminal (160 or 170) of the FIG. 1.

In an embodiment, the SS management terminal 400 implements, among other things, the processing discussed in the FIGS. 1A-1E and 2-3.

The SS management terminal 400 includes at least one hardware processor 401 and a remote management auto configuration manager 402.

The remote management auto configuration manager 402 is configured to: 1) execute on the processor 401, 2) scan a SST network for SSTs capable of reporting real-time transaction information to the SS management terminal, and 3) automatically configure one or more capable SSTs for immediate reporting of those capable SST's real-time transaction information to the SS management terminal.

In an embodiment, the SST network is the LAN 150 of the FIG. 1A.

In an embodiment, the remote management auto configuration manager 402 is further configured to: present an interactive interface that presents on a display of the SS management terminal a list of capable SSTs from results of the scan and receives the capable SSTs from activated selection(s) made in the interactive interface.

In an embodiment, the interactive interface is the management interface (165 or 175) of the FIG. 1A.

In an embodiment, the interactive interface is the interactive interface discussed above with respect to the method 300 of the FIG. 3.

In an embodiment, the remote management auto configuration manager 402 is the auto manager (165 or 175) of the FIG. 1A.

In an embodiment, the remote management auto configuration manager 402 is the method 200 of the FIG. 2.

In an embodiment, the remote management auto configuration manager 402 is the method 300 of the FIG. 3.

In an embodiment, the SSTs are the SSCO terminals (110, 130, and 140) of the FIG. 1A.

In an embodiment, the SSTs are ATMs.

In an embodiment, the SSTs are kiosks.

In an embodiment, the SSTs are mixtures of combinations of the SSCO terminals (110, 130, and 140), ATMs, and kiosks.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:

scanning, by executable instructions that execute on a hardware processor of a device from a non-transitory computer-readable storage medium as an auto manager, a network of Self-Service Terminals (SSTs) for capable SSTs that are capable of reporting real-time transaction information and scanning the network of SSTs for unavailable SSTs that are incapable of reporting the real-time transaction information, wherein scanning further includes identifying the capable SSTs from the SSTs based on whether any of the SSTs are presently assigned and communicating with existing Self-Service (SS) management terminals, wherein the capable SSTs are unassigned to any of the existing SS management terminals, wherein scanning further includes inspecting the Basic Input/Output Systems (BIOSs) of each SST for a presence indicator of a management interface indicating an installed management interface on that SST and is capable of being automatically configured, wherein when the presence indicator is detected the corresponding SST associated with that presence indicator is considered to be one of the capable SSTs, and wherein when the presence indicator is missing, the corresponding SST associated with a missing presence indicator is considered to be one of the unavailable SSTs that is incapable of being automatically configured, and wherein scanning further includes obtaining an Internet Protocol (IP) address and associated network name for each capable SST and each unavailable SST, wherein the device is a particular one of the SS management terminals;

presenting, by the auto manager, a current status during the scanning and results of the scanning when the scanning completes on a display of the particular one of the SS management terminals;

receiving, by the auto manager, a selection from the results that identifies a particular one of the capable SSTs for reporting that SST's real-time transaction information;

automatically configuring, by the auto manager, the particular one of the capable SSTs by updating a registry key of the capable SST with a host name to one of the existing SS management terminals that is to receive the capable SST's real-time transaction information, wherein automatically configuring further includes identifying the registry key based on an existing management interface already installed on the capable SST; and reporting, by the existing management interface that executes on the particular one the capable SSTs, the particular one's real-time transaction information by the existing management interface using the host name associated with the one of the existing SS management terminals.

2. The method of claim 1, wherein automatically configuring further includes identifying the particular one of the capable SSTs from an operator assignment made by an operator through an interface.

3. The method of claim 1, wherein automatically configuring further includes configuring the particular one of the capable SSTs for reporting that capable SST's real-time transaction information to a server associated with a specific one of the existing SS management terminals.

4. The method of claim 1 further comprising, relaying, by the auto manager, the particular one of the capable SST's real-time transaction information to a server.

\* \* \* \* \*